United States Patent
Nalawadi et al.

(10) Patent No.: US 6,718,401 B2
(45) Date of Patent: Apr. 6, 2004

(54) SYSTEM AND METHOD FOR DEVICE SUPPORT

(75) Inventors: Rajeev K. Nalawadi, Folsom, CA (US); Khong Jye Liew, Folsom, CA (US); Rocky Phagura, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 09/894,333

(22) Filed: Jun. 27, 2001

(65) Prior Publication Data

US 2003/0005259 A1 Jan. 2, 2003

(51) Int. Cl.$^7$ .............................. G06F 3/00; G06F 5/00
(52) U.S. Cl. ............................ 710/13; 710/56; 710/74; 713/1; 713/330; 711/115
(58) Field of Search .......................... 710/7, 8, 13, 36, 710/104, 62, 64, 72, 22, 52, 56, 65, 74; 713/1, 330, 300; 711/115

(56) References Cited

U.S. PATENT DOCUMENTS

| | | | | |
|---|---|---|---|---|
| 6,128,732 A | * | 10/2000 | Chaiken | 713/2 |
| 6,138,183 A | * | 10/2000 | Tien et al. | 710/22 |
| 6,198,262 B1 | * | 3/2001 | Squibb et al. | 323/273 |
| 6,226,237 B1 | * | 5/2001 | Chan et al. | 369/33 |
| 6,240,519 B1 | * | 5/2001 | James, Jr. et al. | 713/202 |
| 6,363,492 B1 | * | 3/2002 | James, Jr. et al. | 714/1 |
| 6,499,102 B1 | * | 12/2002 | Ewertz | 713/1 |

* cited by examiner

Primary Examiner—Rehana Perveen
Assistant Examiner—Rijue Mai
(74) Attorney, Agent, or Firm—Blakely, Sokoloff, Taylor & Zafman LLP

(57) ABSTRACT

System and method for device support. The system may comprise a processor, a memory, a device controller and a basic input-output system (BIOS). The memory may be mapped according to a predetermined specification, such as the Advanced Configuration and Power Interface (ACPI) specification. A device support component in the BIOS uses a portion of a defined region of the memory, such as the non-volatile sleeping (NVS) memory region, to maintain device data for a device. A method involves providing the software component in the BIOS. The software component maps the memory, reserving a portion of the defined region of the memory to maintain a plurality of device data regarding the device controller, and provides support for at least one device utilizing the portion of the defined region of the memory. The system and method may be used with Universal Serial Bus (USB) devices and controllers, as well as with secondary graphics adapters.

27 Claims, 5 Drawing Sheets

SYSTEM AND METHOD FOR DEVICE SUPPORT

FIELD OF THE INVENTION

This invention relates to computers and computing devices that include devices such as Universal Serial Bus (USB) devices and graphics adapters, and more particularly to providing support for these devices using a defined area of memory during and/or after boot up, before an operating system is present and/or after an operating system is loaded.

BACKGROUND

As computers have evolved, the processing power and available memory have both increased with each passing year. However, to allow for continuing use of existing software applications and hardware devices, current computers must take into consideration limitations inherent in earlier computer models so as to provide compatibility. This is sometimes referred to as legacy support, support for legacy systems, support for legacy devices, etc.

One of the most popular computer processor architectures is the 32 bit Intel Architecture known as IA-32. For more information see the *IA-32 Intel Architecture Software Developer's Manual* available from Intel corporation, Santa Clara, Calif. For each new advance in processor technology, certain old limitations must be maintained so as to allow for software and/or component and/or system compatibility.

One such legacy limitation is the ability to access and/or use system memory during boot up. As older systems may have had only 256 Kbytes or 512 Kbytes of random access memory (RAM), an upper threshold from earlier systems limiting memory access to those portions of RAM from zero to 1 Mbyte of memory has been maintained, to various degrees, during processor boot up in current systems conforming to and/or compatible with the IA-32 architecture. That is, during boot up, many systems may only use 1 Mbyte of memory even though the current system may have, for example, 64 Mbytes or 256 Mbytes of RAM.

Such a limitation has drawbacks that restrict system performance in various areas. One such area is device support during system boot up. During the boot process of a computer, a basic input-output system (BIOS) controls what occurs. A BIOS may check the status of various hardware components and devices and receive input from the hardware devices. To do so, the BIOS must be able to receive data from and otherwise communicate with the devices attached to or included in the system. For example, it may be necessary for the BIOS to receive user initiated input such as from a keyboard or for the BIOS to initiate execution of startup software to be read from, for example, a floppy disk, hard disk, and compact disk read-only memory (CD-ROM).

The BIOS may also provide support to a graphics adapter to allow for the display of information on a display monitor for communication to a system user. Because of legacy considerations, only information about a single graphics adapter may be stored in memory. However, some more recent systems include a second graphics adapter to support a second graphics display monitor.

To provide support for all of these devices, the BIOS contains software that uses system RAM to serve as device drivers or other software that supports various devices. However, in some systems the available RAM is limited based on legacy considerations to only the space from 0 to 1 Mbyte. As such, the BIOS software, the device drivers and/or other software and their associated data structures may encroach on or exceed this legacy limitation.

BRIEF DESCRIPTION OF THE DRAWINGS

The invention described herein is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

In current computers featuring processors that conform to and/or are compatible with the 32 bit Intel Architecture known as IA-32 promulgated by Intel Corporation, access to system memory during boot up is limited to the first megabyte of memory to allow for compatibility with earlier systems. (For more information on IA-32 architecture see the *IA-32 Intel Architecture Software Developer's Manual* available from Intel corporation, Santa Clara, Calif.). To better allow the basic input-output system (BIOS) of computers to support devices during system boot up, the BIOS may be provided access to system memory outside of and exceeding the 1 Mbyte limitation of the IA-32 architecture. According to the system and method described herein, when system memory is mapped according to a specification such as the Advanced Configuration and Power Interface (ACPI) specification (rev. 2.0 dated Jul. 27, 2000; see also *ACPI Component Architecture Programmer Reference*, rev. 1.05 dated Feb. 27, 2001 available from Intel Corporation of Santa Clara, Calif.), a portion of a Non-Volatile Sleeping (NVS) region of memory may be used by the BIOS, in one embodiment, to provide device support during system boot up, and, in another embodiment, through all use of the system.

Figure 1:
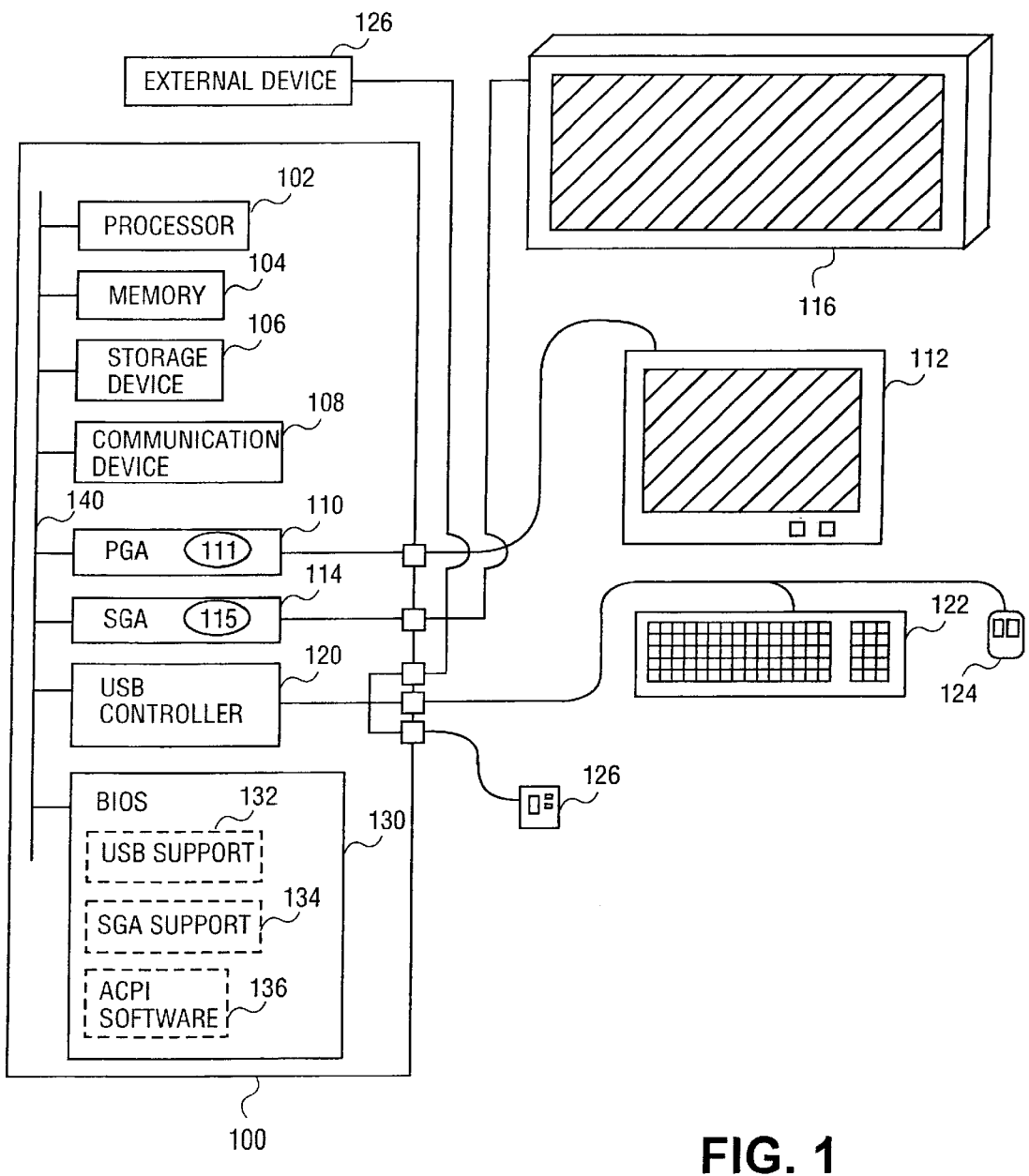
FIG. 1 illustrates a hardware environment in which one embodiment of the invention executes.

FIG. 1 illustrates a hardware environment in which one embodiment of the invention executes. A computing device such as personal computer 100 may include processor 102, memory 104, storage device 106, and communications device 108 coupled to bus 140. In one embodiment, the processor may be an IA-32 processor or similarly compatible processor. In one embodiment, memory 104 may be any kind of random access memory (RAM). In one embodiment, storage device 106 may be any kind of machine readable medium including, for example, magnetic media such as disk drives and magnetic tape; optical drives such as compact disk read only memory (CD-ROM) and readable and writeable compact disks (CD-RW); stick and card memory devices; ROM, RAM, flash memory devices and the like; whether internal, such as storage device 106, directly coupled such as such as external device 126, accessible locally or remotely via a network, and via electrical, optical, acoustical or other form of propagated signals (e.g., carrier waves, infrared signals, digital signals, etc.) via communications device 108. In one embodiment, communications device 108 may be a modem, network interface unit, or other communications device that allows for communication with other computing devices.

Personal computer 100 may include primary graphics adapter (PGA) 110 that allows for the display of information such as text and graphics on display monitor 112. PGA 110 includes PGA video option ROM 111 which provides hardware dependent information that is used in delivering text and graphics to a display monitor. Personal computer 100 may also include secondary graphics adapter (SGA) 114 that allows for the display of information such as text and graphics on second display monitor 116. SGA 114 includes SGA video option ROM 115 which provides hardware dependent information that is used in delivering text and graphics to a display monitor. PGA 110 and SGA 114 may provide support for the video graphics array (VGA), super VGA (SVGA) and/or other graphics standards. In one embodiment, PGA video option ROM 111 and SGA video option ROM 115 may each be electronically erasable programmable read only memory (EEPROM) chips. In one embodiment, either or both of SGA 114 and PGA 110 may be included as part of an integrated processor/graphics chipset. In one embodiment, either or both of SGA 114 and PGA 110 may be coupled to the system via an Accelerated Graphics Port (AGP) interface supported by the chipset used in personal computer 100.

Personal computer 100 may include a Universal Serial Bus (USB) host controller 120 which allows for two-way communication with external USB devices, such as external device 126. Although only one USB host controller is shown, multiple USB host controllers may be included in the personal computer. In various embodiments external device 126 may be any USB enabled device, such as, for example, a device for reading and/or writing a machine readable medium, a digital camera, a printer, a digital music player/recorder such as an MP3 player, etc. Various USB enabled input devices may also be coupled to personal computer 100 via USB controller 120, such as, for example, keyboard 122 and mouse 124. In one embodiment, a USB enabled biometric device such as fingerprint reader 150, retinal scanner or voice recognition device may be coupled to personal computer 100 via USB controller 120. In addition, each of the USB enabled devices may include its own host controller.

Graphics adapter 110 and USB controller 120 are each coupled to bus 140. Although only one each of processor 102, external device 126 and storage device 106 are depicted, multiple processors and multiple storage devices may be included in personal computer 100, and multiple external devices may be coupled to personal computer 100 via external device 126. A BIOS 130 that may include USB support software 132 and/or SGA support software 134 is also coupled to bus 140. USB support software 132 and SGA support software 134 are discussed in more detail below. In one embodiment, BIOS 130 also includes ACPI software 136 which is executed during the boot process to provide support for the ACPI specification. In one embodiment, BIOS 130 may be software stored on hardware such as an electrically erasable programmable read-only memory (EEPROM) device, a flash memory device, etc. In one embodiment, bus 140 may be a USB such that all components and devices communicate via USB.

According to one embodiment of the system and method presented herein, during start-up of the computing device, the computing device may request input from the user. To do so, software in the BIOS may display information on a display to the user, and the user may provide input via a keyboard or keypad, a mouse, a biometric device, and/or other input devices, each which may be coupled to the computing device via USB. In addition, a user identification card may be presented via a USB enabled card reader (not shown) to authenticate the user's access to the computing device. In some situations, a software update or other software may need to be read or otherwise executed by the BIOS from a storage device coupled to the computing device via the USB controller. To support the multitude of devices which may be coupled to the computing device via a USB host controller, the BIOS stores device information in the computing device's memory. However, due to historical system architecture limitations, the BIOS may be restricted to using the first megabyte of system memory.

However, the ACPI specification, which is being supported on current computing devices such as personal computers, provides a region in memory which can be used to store information regarding USB devices. In one embodiment, the USB support software obtains a portion of the NVS region of memory and uses it to store USB device data such as transfer descriptors.

Figure 2:
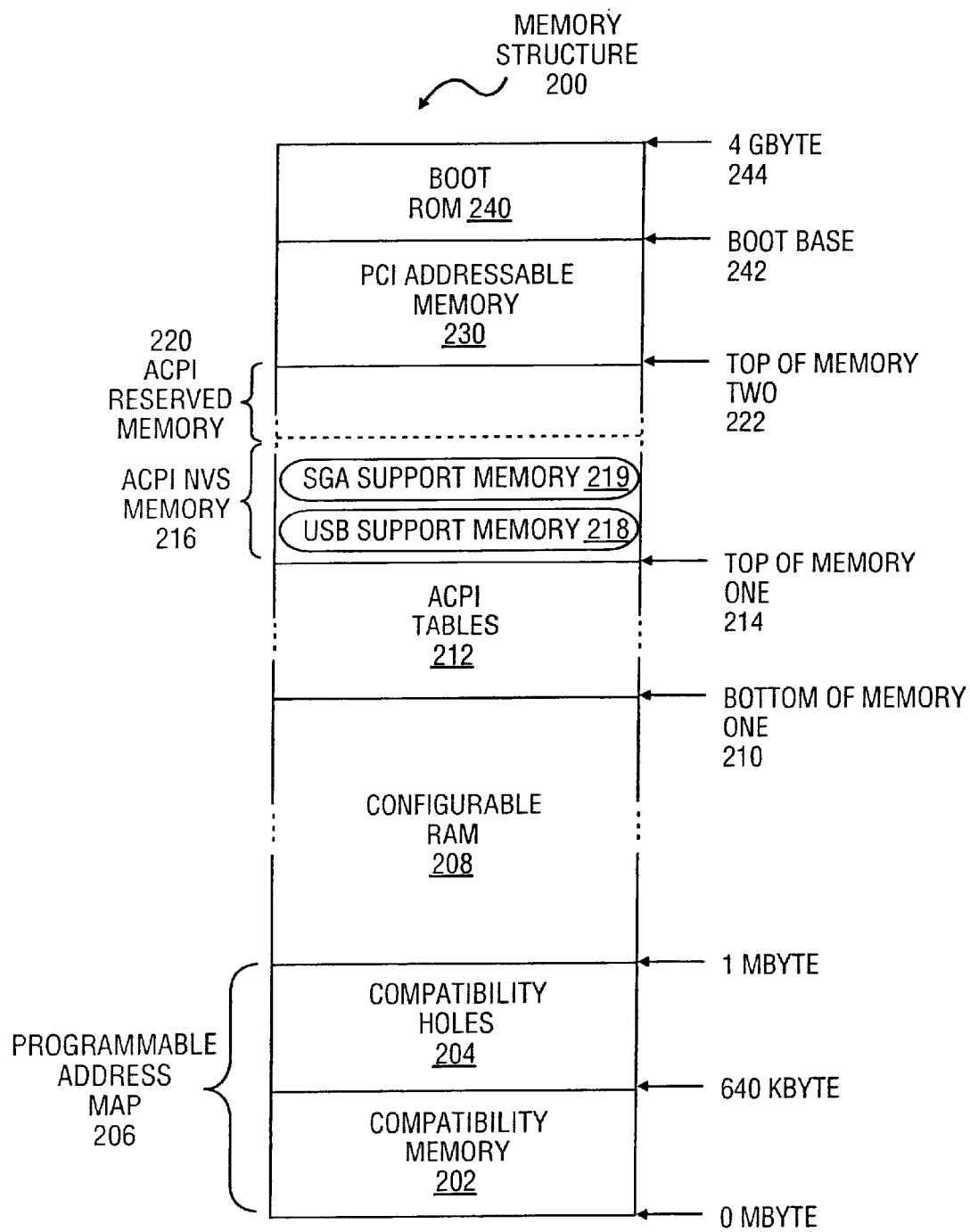
FIG. 2 illustrates a diagram of system memory showing the location of an embodiment of the invention.

FIG. 2 illustrates a diagram of system memory showing the location of an embodiment of the invention. In one embodiment, the system memory is mapped according to memory structure 200, as defined in the ACPI specification. Compatibility memory 202 is located in the region of memory located at from 0 to 640 Kbytes. Compatibility holes 204 are located at from 640 Kbyte to 1 Mbyte. In traditional systems, the BIOS was limited to accessing compatibility memory 202 and compatibility holes 204. The compatibility memory 202 and compatibility holes 204 may be referred to as the programmable address map (PAM) region of memory 206. The ACPI specification also defines operating system usable system memory as contiguous RAM 208 which is located at from 1 Mbyte to the bottom of memory one 210. In one embodiment, bottom of memory one 210 may be 8 Mbytes. ACPI tables 212 are located in the region from bottom of memory one 210 to an area referred to in the ACPI specification as the top of memory one, denoted 214 in FIG. 2. The area of memory between the top of memory one and what the ACPI specification refers to as the top of memory two, denoted 222 in FIG. 2, is defined to include two regions of memory, ACPI NVS memory 216 and ACPI reserved memory 220. It is a portion of ACPI NVS memory 216 that the method and system described herein uses, in one embodiment, to provide USB support and, in another embodiment, to provide SGA support. One portion of memory is denoted USB support memory 218 within or part of ACPI NVS memory 216. Another portion of memory is denoted SGA support memory 219 within or part of ACPI NVS memory 216. To complete the memory structure description, the ACPI specification also defines a "no memory region" referred to in one embodiment as Peripheral Component Interconnect (PCI) bus addressable memory 230 located between top of memory two and boot base 242. The memory area from boot base 242 to the top of memory 244, at, in one embodiment, 4 Gbytes, is virtually used for boot ROM 240.

Figure 3:
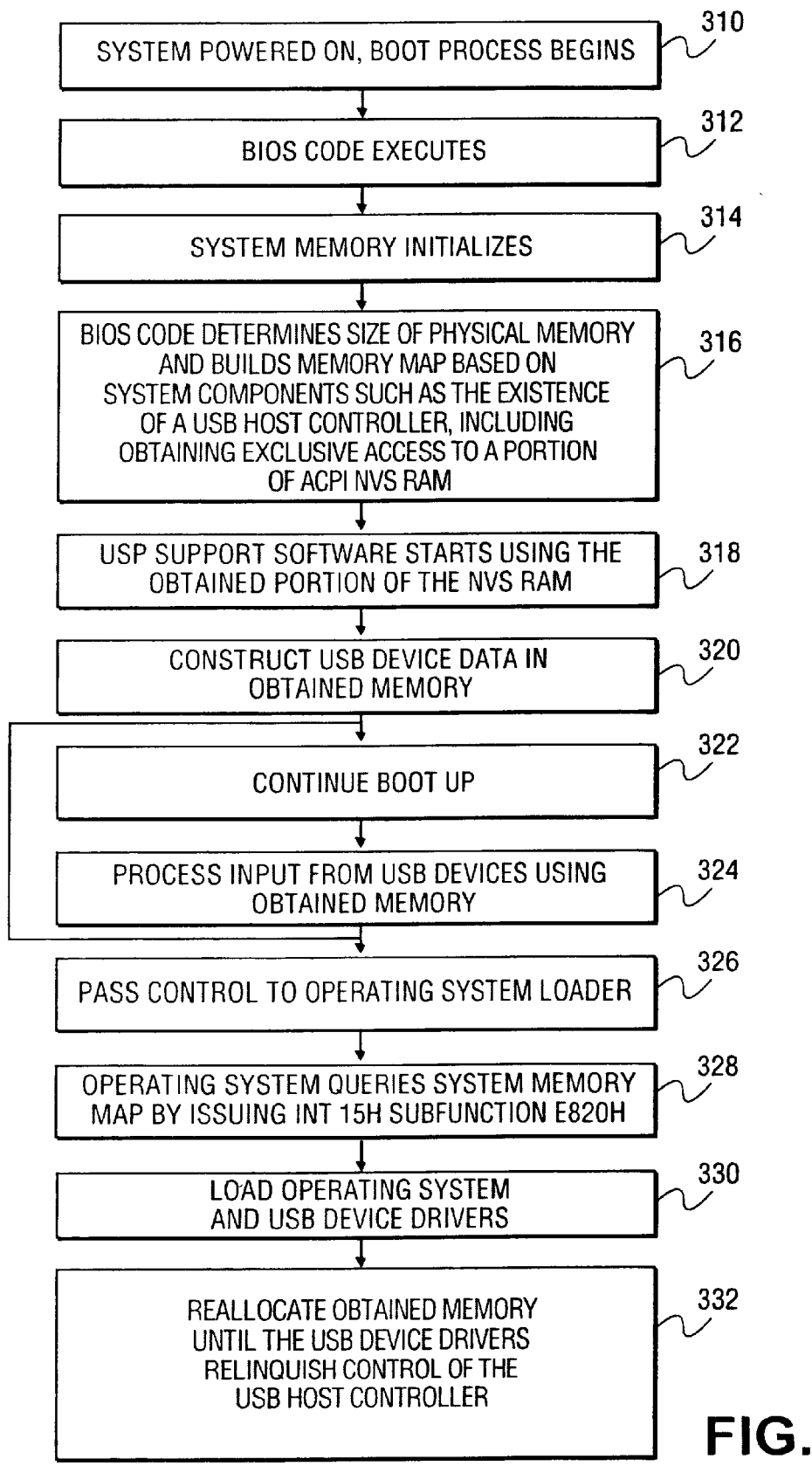
FIG. 3 illustrates a flow of actions taken pursuant to one embodiment of the invention.

FIG. 3 illustrates a flow of actions taken pursuant to one embodiment of the invention. When a system such as a computing device is powered on, the boot process begins, as shown in block 310. The BIOS code is transferred to and executes from the PAM region of memory. The BIOS code executes, as shown in block 312. The BIOS code determines the size of physical memory and builds a memory map based on system components such as the existence of a USB host controller, including obtaining exclusive access to a portion of ACPI NVS RAM, which may be referred to as USB support memory, as shown in block 316. The BIOS code also copies software and/or other information obtained from various devices which may be part of the computing device or personal computer, such as, for example, the contents of modem option ROM, the contents of PGA video option ROM, local area network (LAN) card option ROM, small computer system interconnect (SCSI) option ROM, etc. All of the software code from each of these ROMs as well as the BIOS code itself are stored in the PAM region of memory.

The BIOS code may also include ACPI software that implements the ACPI specification, including providing an interface by which the operating system may access ACPI tables (see ACPI software 136 of FIG. 1). It is through this ACPI interface that an operating system may obtain information about and control the characteristics of motherboard devices and other devices coupled to the personal computing device. The ACPI interface may be accessed by the operating system using ACPI Machine Language (AML). AML is the ACPI control method virtual machine language, a machine code for a virtual machine which is supported by an ACPI-compatible operating system. AML is a pseudo-assembly language that is interpreted by an operating system driver. AML is a language processed by an ACPI method interpreter and is primarily a declarative language in that AML provides a set of declarations that are compiled by the ACPI interpreter into the ACPI name space at definition block load time. The AML resides in the ACPI tables within the system BIOS. A portion of the ACPI software in the BIOS known as ACPI control methods may be written in ACPI Source Language (ASL) as the source language. Original equipment manufacturers (OEMs) and BIOS developers may write control methods in ASL. The ASL code is then translated to AML. ASL and AML are different languages that are closely related.

As set forth in the ACPI specification, the ACPI NVS memory region typically holds data that is saved/restored during a resume from one of the ACPI power management suspend states. The ACPI NVS region is generally used to hold critical data that is used to program various devices such as, for example, onboard chipsets, processor(s), PCI devices, AGP devices, Super I/O, etc. when resuming from a suspend state.

The USB support software then starts using the portion of the NVS RAM obtained and constructs USB device data in the obtained memory, as shown in blocks 318 and 320. The USB device data is built and maintained based on power-on or start-up signaling received from USB devices via a USB host controller. Boot up continues, as shown in block 322. The USB support software may process input data received from USB devices, utilizing the obtained memory, as shown in block 324. Such data may include input requested by software in the BIOS and/or other boot-up software within the system, and may also include data initiated by a device that includes its own automatic start-up software. In addition, this data may include data requested by the operating system via USB devices while the operating system is loading, before the operating system is fully loaded, and before the operating system has loaded USB device drivers or other USB supporting components. Boot up continues and input is processed from USB devices, as shown in blocks 322 and 324, until control is passed to the operating system loader, as shown in block 326. In one embodiment, the operating system may not support USB devices such that the USB support software from the BIOS continues to handle all USB device support via the obtained portion of ACPI NVS memory, the USB support memory, during any use of the system.

The operating system queries the system memory map by issuing an interrupt 15H subfunction E820H, as shown in block 328. In this way, the operating system obtains the system memory map. After obtaining the system memory map from the System BIOS, the operating system will refrain from using the memory region declared as ACPI NVS for its normal functioning. The operating system and USB device drivers are loaded, as shown in block 330. In one embodiment, the USB device driver may be included in or be part of an operating system, such that only the operating system need be loaded. The USB support software then internally de-allocates the obtained memory, the USB support memory, until the operating system/USB drivers relinquish control of the USB host controller(s), as shown in block 332. That is, the obtained memory is no longer used in supporting USB devices until the BIOS is given control again of the USB host controller(s) when the USB drivers are unloaded.

Figure 4:
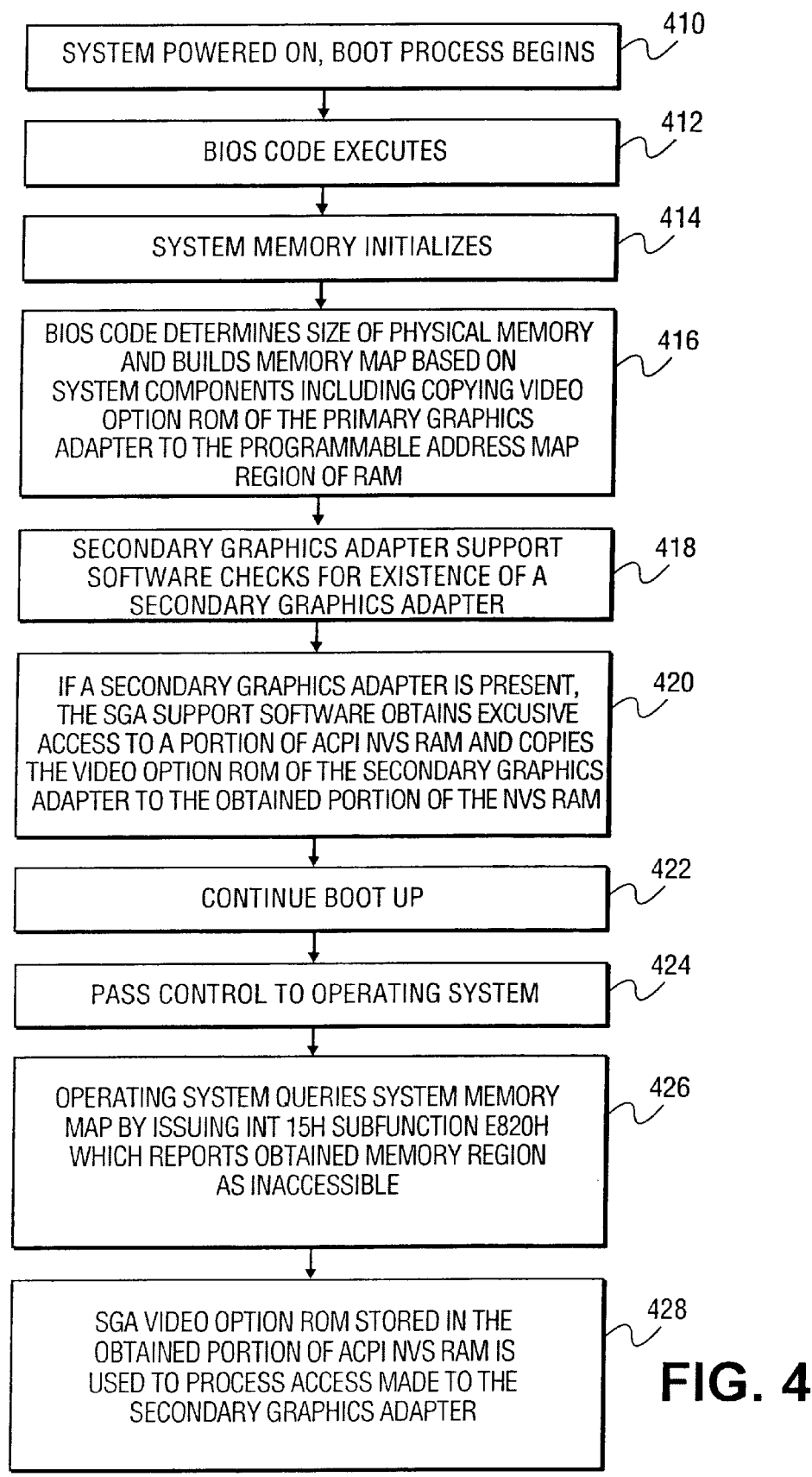
FIG. 4 illustrates a flow of actions taken pursuant to another embodiment of the invention.

FIG. 4 illustrates a flow of actions taken pursuant to another embodiment of the invention. When a system such as a computing device is powered on, the boot process begins, as shown in block 410. The BIOS code executes, as shown in block 412. The BIOS code determines the size of physical memory and builds a memory map based on system components, including copying the content of the video option ROM of the primary graphics adapter to the programmable address map region of RAM, as shown in block 416. The BIOS code may also copy software and/or other information obtained from various devices which may be part of the computing device or personal computer, such as, for example, the contents of a modem option ROM, a local area network (LAN) card option ROM, a small computer system interconnect (SCSI) option ROM, etc. All of the software code from each of these ROMs as well as the BIOS code itself are stored in the PAM region of memory.

The secondary graphics adapter support software then checks for the existence of a secondary graphics adapter, as shown in block 418. If there is a SGA, because of legacy considerations, the SGA may contain an option ROM which often has an access time of between 100 and 120 nanoseconds. To increase the speed at which information may be accessed from the SGA video option ROM, the contents of the SGA video option ROM may be copied to an area of memory from which information may be accessed in a shorter amount of time, typically in the range of 10 to 20 nanoseconds. This allows for faster access of the contents of the SGA video option ROM. In one embodiment, the size of the contents of the SGA video option ROM may be 48 Kbytes. In current computer systems, system memory in the form of various kinds of RAM operates at speeds significantly faster than the speed of video option ROMs. In some embodiments, system memory speeds may be 100 Mhz and 133 Mhz. If a secondary graphics adapter is present, the SGA support software obtains exclusive access to a portion of ACPI NVS RAM, which may be referred to as SGA support memory, and copies the contents of the video option ROM of the secondary graphics adapter to the obtained portion of the NVS RAM, as shown in block 420.

Boot up continues, as shown in block 422. Control of the system is passed to the operating system, as shown in block 424. The operating system queries the system memory map by issuing an interrupt 15H subfunction E820H which reports the obtained memory region as ACPI NVS (Reserved), as shown in block 426. After obtaining the system memory map from the BIOS, by virtue of the obtained portion being declared as ACPI NVS (Reserved), the operating system will refrain from using the obtained portion of memory during its normal functioning. The SGA video option ROM stored in the obtained portion of ACPI NVS RAM, the SGA support memory, is then used to process access made to the secondary graphics adapter when necessary, as shown in block 428. Such access to the obtained portion of ACPI NVS RAM increases throughput when performing operations involving the SGA video option ROM when compared to accessing the ROM itself.

Figure 5:
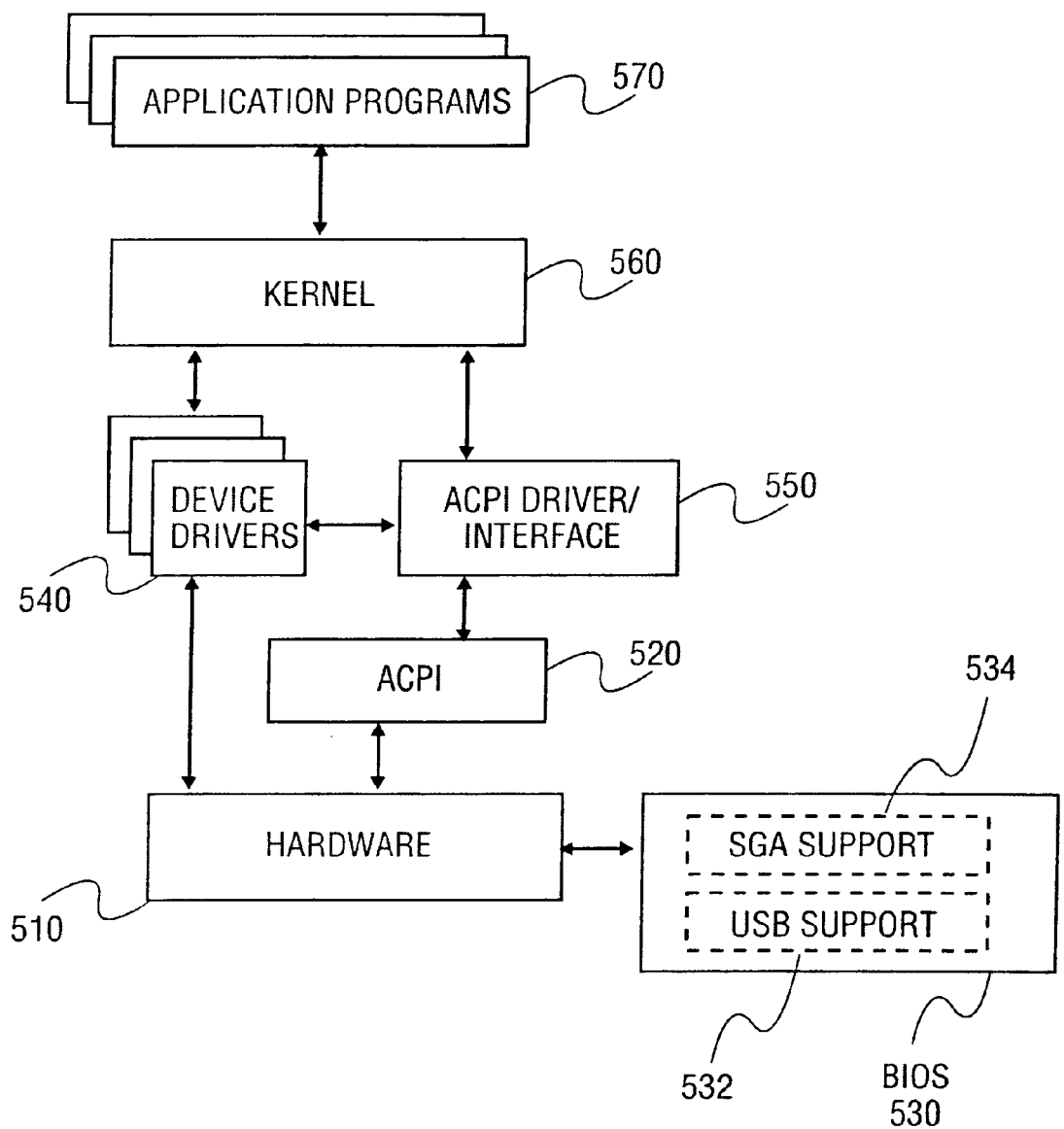
FIG. 5 illustrates a functional block diagram of an embodiment of the invention.

FIG. 5 illustrates a functional block diagram of an embodiment of the invention. Generally, the ACPI specification defines ACPI driver/interface 550 to ACPI 520 through which an operating system kernel 560 may communicate with and control system hardware 510 and devices via device drivers 540. The BIOS 530 is considered to be on the same level as hardware 510. As discussed above, BIOS 530 may contain USB support software 532 and/or SGA support software 534. Before the ACPI driver/interface 550, device drivers 540 and kernel 560 are fully loaded and up and running in a computing device, software in the BIOS and/or the ACPI software may require user input via a USB device or other information from a USB device to proceed with booting up. In one embodiment, USB support software 532 included in BIOS 530 provides the necessary support for accessing these USB devices by utilizing a portion of the ACPI NVS region of memory until the applicable device drivers and the operating system are loaded. If no support is provided for USB devices by the operating system, then the USB support software continues to provide USB support throughout the duration of use of the computing device. In another embodiment, SGA support software 534 included in BIOS 530 increases throughput when accessing a second display device by utilizing a portion of the ACPI NVS region of memory to hold a copy of the SGA video option ROM. Access to the information from the SGA video option ROM via the NVS RAM is faster than accessing the same information from the SGA video option ROM itself.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:

a processor coupled to a bus;

a memory coupled to the bus, the memory mapped according to a predetermined specification;

a device controller coupled to the bus; and a basic input-output system (BIOS) coupled to the bus, the BIOS having a device support component to provide support for a device using a portion of a defined region of the memory allocated to maintain a plurality of device data and to de-allocate the portion of the defined region of the memory when an operating system providing device support is loaded.

2. The system of claim 1 wherein:

the predetermined specification is the Advanced Configuration and Power Interface (ACPI) specification; and the defined region is the non-volatile sleeping (NVS) region defined by the ACPI specification.

3. The system of claim 1 wherein:

the device controller is a Universal Serial Bus (USB) host controller, the device is a USB device; and the device data comprises USB transaction descriptors.

4. The system of claim 3 wherein the USB device comprises at least one of a keyboard, a mouse, a floppy drive, a compact disk read only memory (CD-ROM) player.

5. The system of claim 4 wherein the device support component is to provide support for Universal Serial Bus (USB) devices until an operating system providing USB device support is loaded.

6. The system of claim 1 further comprising a secondary device controller wherein:

the device controller and the secondary device controller are graphics adapters;

the secondary device controller comprises a video option read-only memory (ROM); and the device support component is to copy the contents of the video option ROM to the portion of the defined region of the memory such that access requests involving the video option ROM are redirected to the portion of the redefined region of the memory.

7. The system of claim 1 wherein the processor conforms to the 32 bit Intel Architecture (IA-32).

8. The system of claim 1 wherein the processor is compatible with the 32 bit Intel Architecture (IA-32).

9. A system comprising:

a processor coupled to a bus;

a memory coupled to the bus;

a device controller coupled to the bus;

a basic input-output system (BIOS) coupled to the bus, the BIOS having instructions which when executed cause the processor to perform operations including:

mapping the memory pursuant to a predetermined specification to include a defined region of the memory;

allocating a portion of the defined region of the memory to be used to maintain a plurality of device data regarding a device; and de-allocating the portion of the defined region of the memory when an operating system providing device support is loaded.

10. The system of claim 9 wherein:

the predetermined specification is the Advanced Configuration and Power Interface (ACPI) specification; and the defined region is the non-volatile sleeping (NVS) region defined by the ACPI specification.

11. The system of claim 9 wherein:

the device controller is a Universal Serial Bus (USB) controller;

the device is a USB device; and the device data comprises USB transaction descriptors.

12. The system of claim 9 further comprising a secondary device controller wherein:

the device controller and the secondary device controller are graphics adapters;

the secondary device controller comprises a video option read only memory (ROM); and the plurality of device data is a copy of the contents of the video option ROM.

13. The system of claim 10 wherein allocating comprises:

receiving an interrupt 15h sub-function E820h.

14. A system comprising:
a processor coupled to a bus;
a memory coupled to the bus;
a Universal Serial Bus (USB) controller coupled to the bus;
a basic input-output system (BIOS) coupled to the bus, the BIOS having instructions which when executed cause the processor to perform operations including:
  mapping the memory pursuant to a predetermined specification to include a defined region of the memory;
  allocating a portion of the defined region of the memory to be used to maintain a plurality of USB device data; and
  de-allocating the portion of the defined region of the memory when an operating system to provide USB device support is loaded.

15. The system of claim 15 wherein:
the predetermined specification is the Advanced Configuration and Power Interface (ACPI) specification; and
the defined region is the non-volatile sleeping (NVS) region defined by the ACPI specification.

16. The system of claim 15 wherein allocating comprises:
receiving an interrupt 15h sub-function E820h.

17. A system comprising:
a processor coupled to a bus;
a memory coupled to the bus;
a primary graphics adapter coupled to the bus;
a secondary graphics adapter coupled to the bus, the secondary graphics adapter comprising a video option read only memory (ROM);
a basic input-output system (BIOS) coupled to the bus, the BIOS having instructions which when executed cause the processor to perform operations including:
  mapping the memory pursuant to a predetermined specification to include a defined region of the memory;
  copying the contents of the video option ROM to a portion of the defined region of the memory.

18. The system of claim 17 wherein:
the predetermined specification is the Advanced Configuration and Power Interface (ACPI) specification; and
the defined region is the non-volatile sleeping (NVS) region defined by the ACPI specification.

19. The system of claim 18 wherein the BIOS has further instructions which when executed cause the processor to perform further operations including:
redirecting access requests involving the video option ROM to the portion of the NVS memory region.

20. The system of claim 18 wherein the BIOS has further instructions which when executed cause the processor to perform further operations including:
limiting access to the portion of the NVS memory region.

21. A method comprising:
mapping a memory pursuant to the Advanced Configuration and Power Interface (ACPI) specification to include a non-volatile-sleeping (NVS) memory region;
reserving a portion of the NVS memory region to maintain a plurality of device data regarding a device controller;
providing basic input/output system (BIOS) support for at least one device utilizing the portion of the NVS memory region.

22. The method of claim 21 wherein:
the device controller is a Universal Serial Bus (USB) host controller;
the device is a Universal Serial Bus (USB) device; and
the device data comprises USB transaction descriptors.

23. The method of claim 22 wherein the providing ceases when an operating system providing USB device support is loaded.

24. The method of claim 21 wherein
the device controller is a secondary graphics adapter having a video option read-only memory (ROM),
the device is a secondary video display, and
the device data is a copy the contents of the video option ROM.

25. A method comprising:
mapping a memory pursuant to the Advanced Configuration and Power Interface (ACPI) specification to include a non-volatile-sleeping (NVS) memory region;
reserving a portion of the NVS memory region to maintain a plurality of Universal Serial Bus (USB) device data; and
providing basic input/output system (BIOS) USB device support utilizing the portion of the NVS memory region.

26. The method of claim 25 further comprising:
returning the portion of the NVS memory region when USB device drivers are loaded.

27. The method of claim 25 wherein providing ceases when USB device drivers have been loaded.

* * * * *